US009861929B2

(12) United States Patent
Tammera et al.

(10) Patent No.: US 9,861,929 B2
(45) Date of Patent: Jan. 9, 2018

(54) APPARATUS AND SYSTEM FOR SWING ADSORPTION PROCESSES RELATED THERETO

(71) Applicants: Robert F. Tammera, Warrenton, VA (US); Jeffrey W. Frederick, Spring Mills, PA (US)

(72) Inventors: Robert F. Tammera, Warrenton, VA (US); Jeffrey W. Frederick, Spring Mills, PA (US)

(73) Assignee: ExxonMobil Upstream Research Company, Spring, TX (US)

( * ) Notice: Subject to any disclaimer, the term of this patent is extended or adjusted under 35 U.S.C. 154(b) by 12 days.

(21) Appl. No.: 15/079,559

(22) Filed: Mar. 24, 2016

(65) Prior Publication Data

US 2016/0332105 A1 Nov. 17, 2016

Related U.S. Application Data

(60) Provisional application No. 62/162,186, filed on May 15, 2015.

(51) Int. Cl.
*B01D 53/04* (2006.01)
*B01D 53/047* (2006.01)

(52) U.S. Cl.
CPC ....... *B01D 53/047* (2013.01); *B01D 53/0407* (2013.01); *B01D 53/0446* (2013.01);
(Continued)

(58) Field of Classification Search
CPC ............... B01D 53/04; B01D 53/0407; B01D 53/0446; B01D 53/0462; B01D 53/047; B01D 2253/34; B01D 2256/245; B01D 2257/304; B01D 2257/504; B01D 2259/40013; B01D 2259/40028; B01D 2259/40043; B01D 2259/40086;
(Continued)

(56) References Cited

U.S. PATENT DOCUMENTS 1,868,138 A 7/1932 Fisk
3,103,425 A 9/1963 Meyer ............................. 55/62
(Continued)

FOREIGN PATENT DOCUMENTS

CA 2297590 9/2000 ........... B01D 53/047
CA 2297591 9/2000 ............... F17D 1/02
(Continued)

OTHER PUBLICATIONS

Conviser, S. A. (1964) "Removal of $CO_2$ from Natural Gas With Molecular Sieves," *Proceedings of the Gas Conditioning Conf. Univ. of Oklahoma*, pp. 1F-12F.
(Continued)

*Primary Examiner* — Frank Lawrence
(74) *Attorney, Agent, or Firm* — ExxonMobil Upstream Research Company Law Department

(57) ABSTRACT

Provided are apparatus and systems for performing a swing adsorption process. This swing adsorption process may involve passing fluids through an adsorbent bed unit having a contactor disposed within to separate contaminates from other target components. The process includes a purge stream that introduced into the contactor at a location between a first portion and a second portion of the contactor.

28 Claims, 7 Drawing Sheets

(52) U.S. Cl.
CPC ...... *B01D 53/0462* (2013.01); *B01D 2253/34* (2013.01); *B01D 2256/245* (2013.01); *B01D 2257/304* (2013.01); *B01D 2257/504* (2013.01); *B01D 2259/40013* (2013.01); *B01D 2259/40028* (2013.01); *B01D 2259/40043* (2013.01); *B01D 2259/4062* (2013.01); *B01D 2259/40086* (2013.01); *B01D 2259/41* (2013.01); *B01D 2259/4148* (2013.01); *Y02C 10/08* (2013.01)

(58) Field of Classification Search
CPC ........ B01D 2259/4062; B01D 2259/41; B01D 2259/4148
USPC .................. 95/96–103; 96/121, 131, 132
See application file for complete search history.

(56) References Cited

U.S. PATENT DOCUMENTS

| | | | |
|---|---|---|---|
| 3,124,152 A | 3/1964 | Payne | 137/269.5 |
| 3,142,547 A | 7/1964 | Marsh | 55/26 |
| 3,365,859 A * | 1/1968 | Sandberg | B01D 53/04 208/310 R |
| 3,436,839 A * | 4/1969 | Ellington | B01D 53/0438 34/80 |
| 3,508,758 A | 4/1970 | Strub | 277/15 |
| 3,602,247 A | 8/1971 | Bunn et al. | 137/270 |
| 3,788,036 A | 1/1974 | Lee et al. | 55/25 |
| 3,967,464 A | 7/1976 | Cormier et al. | 62/13 |
| 4,187,092 A | 2/1980 | Woolley | 62/48 |
| 4,261,815 A | 4/1981 | Kelland | 209/213 |
| 4,321,069 A * | 3/1982 | Ritter | B01D 53/04 96/116 |
| 4,324,565 A | 4/1982 | Benkmann | 55/23 |
| 4,325,565 A | 4/1982 | Winchell | 280/282 |
| 4,326,858 A * | 4/1982 | Benkmann | B01D 53/0476 95/122 |
| 4,329,162 A | 5/1982 | Pitcher | 55/523 |
| 4,340,398 A | 7/1982 | Doshi et al. | 55/25 |
| 4,386,947 A | 6/1983 | Mizuno et al. | 55/387 |
| 4,445,441 A | 5/1984 | Tanca | 110/165 |
| 4,461,630 A | 7/1984 | Cassidy et al. | 55/25 |
| 4,496,376 A | 1/1985 | Hradek | 55/163 |
| 4,705,627 A | 11/1987 | Miwa et al. | 210/264 |
| 4,711,968 A | 12/1987 | Oswald et al. | 568/454 |
| 4,737,170 A | 4/1988 | Searle | 55/179 |
| 4,770,676 A | 9/1988 | Sircar et al. | 55/26 |
| 4,783,205 A | 11/1988 | Searle | 55/161 |
| 4,784,672 A | 11/1988 | Sircar | 55/26 |
| 4,790,272 A | 12/1988 | Woolenweber | 123/188 |
| 4,814,146 A | 3/1989 | Brand et al. | 422/179 |
| 4,816,039 A | 3/1989 | Krishnamurthy et al. | 55/26 |
| 4,877,429 A | 10/1989 | Hunter | 55/162 |
| 4,977,745 A | 12/1990 | Heichberger | 62/10 |
| 5,104,426 A * | 4/1992 | Yamada | B01D 53/0446 95/102 |
| 5,110,328 A | 5/1992 | Yokota et al. | 55/180 |
| 5,125,934 A | 6/1992 | Krishnamurthy et al. | 55/25 |
| 5,169,006 A | 12/1992 | Stelzer | 209/223.1 |
| 5,174,796 A | 12/1992 | Davis et al. | 55/26 |
| 5,224,350 A | 7/1993 | Mehra | 62/17 |
| 5,234,472 A | 8/1993 | Krishnamurthy et al. | 95/98 |
| 5,292,990 A | 3/1994 | Kantner et al. | 585/820 |
| 5,306,331 A | 4/1994 | Auvil et al. | 95/42 |
| 5,354,346 A | 10/1994 | Kumar | 95/101 |
| 5,365,011 A | 11/1994 | Ramachandran et al. | 585/829 |
| 5,370,728 A | 12/1994 | LaSala et al. | 95/101 |
| 5,447,558 A | 9/1995 | Acharya | |
| 5,547,641 A | 8/1996 | Smith et al. | 422/181 |
| 5,565,018 A | 10/1996 | Baksh et al. | 95/100 |
| 5,672,196 A | 9/1997 | Acharya et al. | 95/97 |
| 5,700,310 A | 12/1997 | Bowman et al. | 95/45 |
| 5,733,451 A | 3/1998 | Coellner et al. | 210/496 |
| 5,735,938 A | 4/1998 | Baksh et al. | 95/101 |
| 5,750,026 A | 5/1998 | Gadkaree et al. | 201/502.1 |
| 5,755,857 A * | 5/1998 | Acharya | B01D 53/0462 96/122 |
| 5,766,311 A | 6/1998 | Ackley et al. | |
| 5,792,239 A | 8/1998 | Reinhold, III et al. | 95/101 |
| 5,807,423 A | 9/1998 | Lemcoff et al. | 95/96 |
| 5,811,616 A | 9/1998 | Holub et al. | 585/504 |
| 5,827,358 A | 10/1998 | Kulish et al. | 96/115 |
| 5,906,673 A | 5/1999 | Reinhold, III et al. | 95/45 |
| 5,914,455 A * | 6/1999 | Jain | B01D 53/0462 95/106 |
| 5,924,307 A | 7/1999 | Nenov | 62/643 |
| 5,930,910 A | 8/1999 | Trapp et al. | |
| 5,935,444 A | 8/1999 | Johnson et al. | 210/691 |
| 5,968,234 A | 10/1999 | Midgett, II et al. | 95/120 |
| 5,976,221 A | 11/1999 | Bowman et al. | 95/45 |
| 5,997,617 A | 12/1999 | Czabala et al. | 96/130 |
| 6,007,606 A | 12/1999 | Baksh et al. | 95/98 |
| 6,011,192 A | 1/2000 | Baker et al. | 585/818 |
| 6,023,942 A | 2/2000 | Thomas et al. | 62/613 |
| 6,053,966 A | 4/2000 | Moreau et al. | 95/96 |
| 6,063,161 A | 5/2000 | Keefer et al. | 95/100 |
| 6,099,621 A | 8/2000 | Ho | 95/139 |
| 6,129,780 A | 10/2000 | Millet et al. | 95/117 |
| 6,136,222 A | 10/2000 | Friesen et al. | 252/184 |
| 6,147,126 A | 11/2000 | DeGeorge et al. | 518/715 |
| 6,171,371 B1 | 1/2001 | Derive et al. | 95/98 |
| 6,176,897 B1 | 1/2001 | Keefer | 95/98 |
| 6,179,900 B1 | 1/2001 | Behling et al. | 95/45 |
| 6,194,079 B1 | 2/2001 | Hekal | 428/566 |
| 6,210,466 B1 | 4/2001 | Whysall et al. | 95/100 |
| 6,231,302 B1 | 5/2001 | Bonardi | 415/105 |
| 6,245,127 B1 | 6/2001 | Kane et al. | 95/101 |
| 6,284,021 B1 | 9/2001 | Lu et al. | 95/96 |
| 6,311,719 B1 | 11/2001 | Hill et al. | 137/312 |
| 6,345,954 B1 | 2/2002 | Al-Himyary et al. | 415/112 |
| 6,398,853 B1 | 6/2002 | Keefer et al. | 96/125 |
| 6,402,813 B2 | 6/2002 | Monereau et al. | 95/96 |
| 6,406,523 B1 | 6/2002 | Connor et al. | 96/125 |
| 6,432,379 B1 | 8/2002 | Heung | 423/648.1 |
| 6,436,171 B1 | 8/2002 | Wang et al. | 95/96 |
| 6,444,012 B1 | 9/2002 | Dolan et al. | 95/99 |
| 6,444,014 B1 | 9/2002 | Mullhaupt et al. | 95/130 |
| 6,444,523 B1 | 9/2002 | Fan et al. | 438/257 |
| 6,451,095 B1 | 9/2002 | Keefer et al. | 96/125 |
| 6,457,485 B2 | 10/2002 | Hill et al. | 137/240 |
| 6,471,939 B1 | 10/2002 | Boix et al. | 423/706 |
| 6,488,747 B1 | 12/2002 | Keefer et al. | 96/125 |
| 6,497,750 B2 | 12/2002 | Butwell et al. | 95/96 |
| 6,500,241 B2 | 12/2002 | Reddy | 96/134 |
| 6,500,404 B1 | 12/2002 | Camblor Fernandez et al. | 423/706 |
| 6,503,299 B2 | 1/2003 | Baksh et al. | 95/98 |
| 6,506,351 B1 | 1/2003 | Jain et al. | 423/239.1 |
| 6,514,318 B2 | 2/2003 | Keefer | 95/96 |
| 6,514,319 B2 | 2/2003 | Keefer et al. | 95/101 |
| 6,517,609 B1 | 2/2003 | Monereau et al. | 95/96 |
| 6,531,516 B2 | 3/2003 | Davis et al. | 518/700 |
| 6,533,846 B1 | 3/2003 | Keefer et al. | 96/125 |
| 6,565,627 B1 | 5/2003 | Golden et al. | 95/96 |
| 6,565,635 B2 | 5/2003 | Keefer et al. | 96/125 |
| 6,565,825 B2 | 5/2003 | Ohji et al. | 423/625 |
| 6,572,678 B2 | 6/2003 | Wijmans et al. | 95/47 |
| 6,579,341 B2 | 6/2003 | Baker et al. | 95/39 |
| 6,593,541 B1 | 7/2003 | Herren | 219/121.67 |
| 6,595,233 B2 | 7/2003 | Pulli | 137/115.05 |
| 6,605,136 B1 | 8/2003 | Graham et al. | 95/98 |
| 6,607,584 B2 | 8/2003 | Moreau et al. | 95/117 |
| 6,630,012 B2 | 10/2003 | Wegeng et al. | 95/106 |
| 6,631,626 B1 | 10/2003 | Hahn | 62/612 |
| 6,641,645 B1 | 11/2003 | Lee et al. | 95/98 |
| 6,651,645 B1 | 11/2003 | Nunez Suarez | 126/9 R |
| 6,660,064 B2 | 12/2003 | Golden et al. | 95/96 |
| 6,660,065 B2 | 12/2003 | Byrd et al. | 95/117 |
| 6,692,626 B2 | 2/2004 | Keefer et al. | 204/491 |
| 6,712,087 B2 | 3/2004 | Hill et al. | 137/240 |
| 6,742,507 B2 | 6/2004 | Keefer et al. | 123/585 |
| 6,746,515 B2 | 6/2004 | Wegeng et al. | 95/96 |
| 6,752,852 B1 | 6/2004 | Jacksier et al. | 95/117 |

(56) References Cited

U.S. PATENT DOCUMENTS

| | | | |
|---|---|---|---|
| 6,770,120 B2 | 8/2004 | Neu et al. | 95/96 |
| 6,773,225 B2 | 8/2004 | Yuri et al. | 415/1 |
| 6,802,889 B2 | 10/2004 | Graham et al. | 95/96 |
| 6,814,771 B2 | 11/2004 | Scardino et al. | 55/385.3 |
| 6,835,354 B2 | 12/2004 | Woods et al. | 422/139 |
| 6,840,985 B2 | 1/2005 | Keefer | 96/125 |
| 6,866,950 B2 | 3/2005 | Connor et al. | 429/13 |
| 6,889,710 B2 | 5/2005 | Wagner | 137/625.46 |
| 6,890,376 B2 | 5/2005 | Arquin et al. | 96/134 |
| 6,893,483 B2 | 5/2005 | Golden et al. | 95/96 |
| 6,902,602 B2 | 6/2005 | Keefer et al. | 95/97 |
| 6,916,358 B2 | 7/2005 | Nakamura et al. | 95/96 |
| 6,918,953 B2 | 7/2005 | Lomax, Jr. et al. | 96/130 |
| 6,921,597 B2 | 7/2005 | Keefer et al. | 429/34 |
| 6,974,496 B2 | 12/2005 | Wegeng et al. | 96/126 |
| 7,025,801 B2 | 4/2006 | Monereau | 95/8 |
| 7,027,929 B2 | 4/2006 | Wang | 702/17 |
| 7,029,521 B2 | 4/2006 | Johansson | 96/128 |
| 7,074,323 B2 | 7/2006 | Ghijsen | 208/101 |
| 7,077,891 B2 | 7/2006 | Jaffe et al. | 96/108 |
| 7,087,331 B2 | 8/2006 | Keefer et al. | 429/17 |
| 7,094,275 B2 | 8/2006 | Keefer et al. | 96/125 |
| 7,097,925 B2 | 8/2006 | Keefer et al. | 429/9 |
| 7,112,239 B2 | 9/2006 | Kimbara et al. | 96/108 |
| 7,117,669 B2 | 10/2006 | Kaboord et al. | 60/288 |
| 7,128,775 B2 | 10/2006 | Celik et al. | 95/96 |
| 7,144,016 B2 | 12/2006 | Gozdawa | 277/399 |
| 7,160,356 B2 | 1/2007 | Koros et al. | 95/50 |
| 7,160,367 B2 | 1/2007 | Babicki et al. | 96/116 |
| 7,166,149 B2 | 1/2007 | Dunne et al. | 95/113 |
| 7,172,645 B1 | 2/2007 | Pfister et al. | 95/116 |
| 7,189,280 B2 | 3/2007 | Alizadeh-Khiavi et al. | 95/130 |
| 7,250,073 B2 | 7/2007 | Keefer et al. | 95/96 |
| 7,250,074 B2 | 7/2007 | Tonkovich et al. | 95/130 |
| 7,255,727 B2 | 8/2007 | Monereau et al. | 95/96 |
| 7,258,725 B2 | 8/2007 | Ohmi et al. | 95/41 |
| 7,276,107 B2 | 10/2007 | Baksh et al. | 95/96 |
| 7,279,029 B2 | 10/2007 | Occhialini et al. | 96/121 |
| 7,285,350 B2 | 10/2007 | Keefer et al. | 429/34 |
| 7,297,279 B2 | 11/2007 | Johnson et al. | 210/669 |
| 7,311,763 B2 | 12/2007 | Neary | 96/121 |
| RE40,006 E | 1/2008 | Keefer et al. | 95/100 |
| 7,314,503 B2 | 1/2008 | Landrum et al. | 95/50 |
| 7,354,562 B2 | 4/2008 | Ying et al. | 423/437.2 |
| 7,387,849 B2 | 6/2008 | Keefer et al. | 429/34 |
| 7,390,350 B2 | 6/2008 | Weist, Jr. et al. | 95/100 |
| 7,404,846 B2 | 7/2008 | Golden et al. | 95/103 |
| 7,449,049 B2 | 11/2008 | Thomas et al. | 95/123 |
| 7,456,131 B2 | 11/2008 | Klett et al. | 502/417 |
| 7,510,601 B2 | 3/2009 | Whitley et al. | 96/121 |
| 7,527,670 B2 | 5/2009 | Ackley et al. | 95/96 |
| 7,553,568 B2 | 6/2009 | Keefer | 429/13 |
| 7,578,864 B2 | 8/2009 | Watanabe et al. | 55/523 |
| 7,604,682 B2 | 10/2009 | Seaton | 95/96 |
| 7,637,989 B2 | 12/2009 | Bong | 96/130 |
| 7,641,716 B2 | 1/2010 | Lomax, Jr. et al. | 95/96 |
| 7,645,324 B2 | 1/2010 | Rode et al. | 95/96 |
| 7,651,549 B2 | 1/2010 | Whitley | 95/96 |
| 7,674,319 B2 | 3/2010 | Lomax, Jr. et al. | 95/19 |
| 7,674,539 B2 | 3/2010 | Keefer et al. | 429/17 |
| 7,687,044 B2 | 3/2010 | Keefer et al. | 422/211 |
| 7,713,333 B2 | 5/2010 | Rege et al. | 95/96 |
| 7,717,981 B2 | 5/2010 | LaBuda et al. | 95/96 |
| 7,722,700 B2 | 5/2010 | Sprinkle | 95/22 |
| 7,731,782 B2 | 6/2010 | Kelley et al. | 95/139 |
| 7,740,687 B2 | 6/2010 | Reinhold, III | 95/96 |
| 7,744,676 B2 | 6/2010 | Leitmayr et al. | 95/99 |
| 7,744,677 B2 | 6/2010 | Barclay et al. | 95/114 |
| 7,758,051 B2 | 7/2010 | Roberts-Haritonov et al. | 277/401 |
| 7,758,988 B2 | 7/2010 | Keefer et al. | 429/34 |
| 7,763,098 B2 | 7/2010 | Alizadeh-Khiavi et al. | 95/96 |
| 7,763,099 B2 | 7/2010 | Verma et al. | 95/96 |
| 7,792,983 B2 | 9/2010 | Mishra et al. | 709/231 |
| 7,806,965 B2 | 10/2010 | Stinson | 95/187 |
| 7,819,948 B2 | 10/2010 | Wagner | 95/100 |
| 7,828,877 B2 | 11/2010 | Sawada et al. | 95/96 |
| 7,828,880 B2 | 11/2010 | Moriya et al. | 95/210 |
| 7,854,793 B2 | 12/2010 | Rarig et al. | 96/116 |
| 7,858,169 B2 | 12/2010 | Yamashita | 428/116 |
| 7,862,645 B2 | 1/2011 | Whitley et al. | 95/96 |
| 7,867,320 B2 | 1/2011 | Baksh et al. | 95/96 |
| 7,938,886 B2 | 5/2011 | Hershkowitz et al. | 95/115 |
| 7,947,118 B2 | 5/2011 | Rarig et al. | 95/98 |
| 7,947,120 B2 | 5/2011 | Deckman et al. | 95/139 |
| 7,959,720 B2 | 6/2011 | Deckman et al. | 96/130 |
| 8,016,918 B2 | 9/2011 | LaBuda et al. | 95/96 |
| 8,034,164 B2 | 10/2011 | Lomax, Jr. et al. | 95/121 |
| 8,071,063 B2 | 12/2011 | Reyes et al. | 423/248 |
| 8,128,734 B2 | 3/2012 | Song | 95/96 |
| 8,142,745 B2 | 3/2012 | Reyes et al. | 423/213.2 |
| 8,142,746 B2 | 3/2012 | Reyes et al. | 423/213.2 |
| 8,192,709 B2 | 6/2012 | Reyes et al. | 423/245.1 |
| 8,210,772 B2 | 7/2012 | Gillecriosd | 405/128.2 |
| 8,227,121 B2 | 7/2012 | Adams et al. | 429/429 |
| 8,262,773 B2 | 9/2012 | Northrop et al. | 95/114 |
| 8,262,783 B2 | 9/2012 | Stoner et al. | 96/108 |
| 8,268,043 B2 | 9/2012 | Celik et al. | 95/96 |
| 8,268,044 B2 | 9/2012 | Wright et al. | 95/96 |
| 8,272,401 B2 | 9/2012 | McLean | 137/625.11 |
| 8,287,629 B2 | 10/2012 | Fujita et al. | 96/126 |
| 8,319,090 B2 | 11/2012 | Kitamura | 136/244 |
| 8,337,594 B2 | 12/2012 | Corma Canos et al. | 95/130 |
| 8,361,200 B2 | 1/2013 | Sayari et al. | 95/139 |
| 8,361,205 B2 | 1/2013 | Desai et al. | 96/121 |
| 8,377,173 B2 | 2/2013 | Chuang | 95/135 |
| 8,444,750 B2 | 5/2013 | Deckman et al. | 95/96 |
| 8,470,395 B2 | 6/2013 | Khiavi et al. | 427/180 |
| 8,480,795 B2 | 7/2013 | Siskin et al. | 95/235 |
| 8,512,569 B2 | 8/2013 | Eaton et al. | 210/650 |
| 8,518,356 B2 | 8/2013 | Schaffer et al. | 423/220 |
| 8,529,662 B2 | 9/2013 | Kelley et al. | 95/96 |
| 8,529,663 B2 | 9/2013 | Reyes et al. | 95/96 |
| 8,529,664 B2 | 9/2013 | Deckman et al. | 95/96 |
| 8,529,665 B2 | 9/2013 | Manning et al. | 95/96 |
| 8,535,414 B2 | 9/2013 | Johnson et al. | 95/95 |
| 8,545,602 B2 | 10/2013 | Chance et al. | 95/96 |
| 8,551,444 B2 | 10/2013 | Agnihotri et al. | 423/648.1 |
| 8,573,124 B2 | 11/2013 | Havran et al. | 102/206 |
| 8,591,627 B2 | 11/2013 | Jain | 95/52 |
| 8,591,634 B2 | 11/2013 | Winchester et al. | 96/127 |
| 8,616,233 B2 | 12/2013 | McLean et al. | 137/246.22 |
| 8,657,922 B2 | 2/2014 | Yamawaki et al. | 95/96 |
| 8,673,059 B2 | 3/2014 | Leta et al. | 95/104 |
| 8,715,617 B2 | 5/2014 | Genkin et al. | 423/652 |
| 8,752,390 B2 | 6/2014 | Wright et al. | 60/780 |
| 8,778,051 B2 | 7/2014 | Weist, Jr. et al. | 95/98 |
| 8,784,533 B2 | 7/2014 | Leta et al. | 95/97 |
| 8,784,534 B2 | 7/2014 | Kamakoti et al. | 95/97 |
| 8,784,535 B2 | 7/2014 | Ravikovitch et al. | 95/98 |
| 8,795,411 B2 | 8/2014 | Hufton et al. | 95/90 |
| 8,808,425 B2 | 8/2014 | Genkin et al. | 95/96 |
| 8,808,426 B2 | 8/2014 | Sundaram | 95/96 |
| 8,814,985 B2 | 8/2014 | Gerds et al. | 95/90 |
| 8,852,322 B2 | 10/2014 | Gupta et al. | 95/136 |
| 8,858,683 B2 | 10/2014 | Deckman | 95/96 |
| 8,875,483 B2 | 11/2014 | Wettstein | 60/39.52 |
| 8,906,138 B2 | 12/2014 | Rasmussen et al. | 95/96 |
| 8,921,637 B2 | 12/2014 | Sundaram et al. | 585/823 |
| 8,939,014 B2 | 1/2015 | Kamakoti et al. | 73/38 |
| 9,005,561 B2 | 4/2015 | Leta | |
| 9,017,457 B2 | 4/2015 | Tammera | 95/96 |
| 9,028,595 B2 | 5/2015 | Sundaram et al. | |
| 9,034,078 B2 | 5/2015 | Wanni et al. | 95/8 |
| 9,034,079 B2 | 5/2015 | Deckman et al. | 95/96 |
| 9,067,168 B2 | 6/2015 | Frederick et al. | 96/108 |
| 9,095,809 B2 | 8/2015 | Deckman et al. | 95/45 |
| 9,108,145 B2 | 8/2015 | Kalbassi et al. | 95/8 |
| 9,120,049 B2 | 9/2015 | Sundaram et al. | 96/121 |
| 9,126,138 B2 | 9/2015 | Deckman et al. | 95/95 |
| 9,162,175 B2 | 10/2015 | Sundaram | 96/121 |
| 9,168,485 B2 | 10/2015 | Deckman et al. | 95/96 |
| 2001/0047824 A1 | 12/2001 | Hill et al. | 137/312 |
| 2002/0124885 A1 | 9/2002 | Hill et al. | 137/312 |

(56) References Cited

U.S. PATENT DOCUMENTS

| | | |
|---|---|---|
| 2002/0162452 A1 | 11/2002 | Butwell et al. ............... 95/96 |
| 2003/0075485 A1 | 4/2003 | Ghijsen ...................... 208/308 |
| 2003/0129101 A1 | 7/2003 | Zettel ......................... 422/179 |
| 2003/0131728 A1 | 7/2003 | Kanazirev et al. ............ 95/96 |
| 2003/0170527 A1 | 9/2003 | Finn et al. ..................... 429/34 |
| 2003/0202918 A1 | 10/2003 | Ashida et al. ............... 422/180 |
| 2003/0205130 A1 | 11/2003 | Neu et al. ..................... 95/90 |
| 2003/0223856 A1 | 12/2003 | Yuri et al. ..................... 415/1 |
| 2004/0099142 A1 | 5/2004 | Arquin et al. ................ 96/134 |
| 2004/0197596 A1 | 10/2004 | Connor et al. ............... 428/630 |
| 2004/0232622 A1 | 11/2004 | Gozdawa ..................... 277/401 |
| 2005/0014511 A1 | 1/2005 | Spain ........................... 96/124 |
| 2005/0109419 A1 | 5/2005 | Ohmi et al. .................. 141/4 |
| 2005/0114032 A1 | 5/2005 | Wang ........................... 702/14 |
| 2005/0129952 A1 | 6/2005 | Sawada et al. .............. 428/409 |
| 2005/0145111 A1 | 7/2005 | Keefer et al. ................. 96/124 |
| 2005/0150378 A1 | 7/2005 | Dunne et al. ................. 95/113 |
| 2005/0229782 A1 | 10/2005 | Monereau et al. ........... 95/96 |
| 2005/0252378 A1 | 11/2005 | Celik et al. ................... 96/121 |
| 2006/0048648 A1 | 3/2006 | Gibbs et al. .................. 96/108 |
| 2006/0049102 A1 | 3/2006 | Miller et al. ............. 210/500.27 |
| 2006/0076270 A1 | 4/2006 | Poshusta et al. ............. 208/240 |
| 2006/0099096 A1 | 5/2006 | Shaffer et al. ............... 418/55.1 |
| 2006/0105158 A1 | 5/2006 | Fritz et al. .................... 428/317.9 |
| 2006/0162556 A1 | 7/2006 | Ackley et al. ................ 95/96 |
| 2006/0165574 A1 | 7/2006 | Sayari .......................... 423/210 |
| 2006/0169142 A1 | 8/2006 | Rode et al. .................... 96/129 |
| 2006/0236862 A1 | 10/2006 | Golden et al. ................ 95/96 |
| 2007/0084241 A1 | 4/2007 | Kretchmer et al. ........... 63/29.2 |
| 2007/0084344 A1 | 4/2007 | Moriya et al. ................ 95/210 |
| 2007/0222160 A1 | 9/2007 | Roberts-Haritonov et al. ......................... 277/387 |
| 2007/0253872 A1 | 11/2007 | Keefer et al. ................. 422/143 |
| 2007/0261557 A1 | 11/2007 | Gadkaree et al. ............ 96/121 |
| 2007/0283807 A1 | 12/2007 | Whitley ........................ 95/96 |
| 2008/0051279 A1 | 2/2008 | Klett et al. .................... 502/60 |
| 2008/0072822 A1 | 3/2008 | White ........................... 118/722 |
| 2008/0128655 A1 | 6/2008 | Garg et al. .................... 252/373 |
| 2008/0282883 A1 | 11/2008 | Rarig et al. ................... 95/96 |
| 2008/0282884 A1 | 11/2008 | Kelley et al. ................. 95/96 |
| 2008/0282885 A1 | 11/2008 | Deckman et al. ............ 95/96 |
| 2008/0282886 A1 | 11/2008 | Reyes et al. .................. 95/98 |
| 2008/0282887 A1 | 11/2008 | Chance et al. ................ 95/98 |
| 2008/0282892 A1 | 11/2008 | Deckman et al. ............ 96/140 |
| 2008/0289497 A1 | 11/2008 | Barclay et al. ................ 95/114 |
| 2008/0307966 A1 | 12/2008 | Stinson ......................... 95/187 |
| 2008/0314550 A1 | 12/2008 | Greco ........................... 165/4 |
| 2009/0004073 A1 | 1/2009 | Gleize et al. ................. 422/180 |
| 2009/0014902 A1 | 1/2009 | Koivunen et al. ............ 265/11 |
| 2009/0025553 A1 | 1/2009 | Keefer et al. ................. 95/96 |
| 2009/0037550 A1 | 2/2009 | Mishra et al. ................ 708/208 |
| 2009/0071333 A1 | 3/2009 | LaBuda et al. ............... 95/96 |
| 2009/0079870 A1 | 3/2009 | Matsui .......................... 348/558 |
| 2009/0107332 A1 | 4/2009 | Wagner ......................... 95/100 |
| 2009/0151559 A1 | 6/2009 | Verma et al. ................. 95/96 |
| 2009/0162268 A1 | 6/2009 | Hufton et al. ................ 423/210 |
| 2009/0180423 A1 | 7/2009 | Kroener ........................ 370/328 |
| 2009/0241771 A1 | 10/2009 | Manning et al. ............. 95/15 |
| 2009/0284013 A1 | 11/2009 | Anand et al. ................. 290/52 |
| 2009/0308248 A1 | 12/2009 | Siskin et al. .................. 95/236 |
| 2009/0314159 A1 | 12/2009 | Haggerty ...................... 95/90 |
| 2010/0059701 A1 | 3/2010 | McLean ........................ 251/304 |
| 2010/0077920 A1 | 4/2010 | Baksh et al. .................. 95/97 |
| 2010/0089241 A1 | 4/2010 | Stoner et al. .................. 96/125 |
| 2010/0186445 A1 | 7/2010 | Minta et al. .................. 62/606 |
| 2010/0212493 A1 | 8/2010 | Rasmussen et al. ......... 95/45 |
| 2010/0251887 A1 | 10/2010 | Jain ............................... 95/46 |
| 2010/0252497 A1 | 10/2010 | Ellison et al. ............ 210/500.1 |
| 2010/0263534 A1 | 10/2010 | Chuang ......................... 95/139 |
| 2010/0282593 A1 | 11/2010 | Speirs et al. .................. 203/11 |
| 2010/0288704 A1 | 11/2010 | Amsden et al. .............. 210/688 |
| 2010/0326272 A1 | 12/2010 | Asaro et al. |
| 2011/0002818 A1 | 1/2011 | Tonkovich et al. |
| 2011/0031103 A1 | 2/2011 | Deckman et al. ............ 203/41 |
| 2011/0067440 A1 | 3/2011 | Van Aken ..................... 62/613 |
| 2011/0067770 A1 | 3/2011 | Pederson et al. ......... 137/625.15 |
| 2011/0146494 A1 | 6/2011 | Desai et al. ................... 96/115 |
| 2011/0217218 A1 | 9/2011 | Gupta et al. .................. 423/228 |
| 2011/0277620 A1 | 11/2011 | Havran et al. ................ 89/1.14 |
| 2011/0291051 A1 | 12/2011 | Hershkowitz et al. ....... 252/373 |
| 2011/0296871 A1 | 12/2011 | Van Soest-Vercammen et al. ............................. 62/636 |
| 2011/0308524 A1 | 12/2011 | Brey et al. .............. 128/205.12 |
| 2012/0011887 A1* | 1/2012 | Nakamura .......... B01D 53/0462 62/640 |
| 2012/0024152 A1 | 2/2012 | Yamawaki et al. ........... 95/96 |
| 2012/0031144 A1 | 2/2012 | Northrop et al. ............. 62/617 |
| 2012/0067216 A1 | 3/2012 | Corma Canos et al. ...... 95/95 |
| 2012/0152115 A1 | 6/2012 | Gerds et al. .................. 95/90 |
| 2012/0222551 A1 | 9/2012 | Deckman ..................... 95/96 |
| 2012/0222552 A1 | 9/2012 | Ravikovitch et al. ........ 95/97 |
| 2012/0222553 A1 | 9/2012 | Kamakoti et al. ............ 95/99 |
| 2012/0222554 A1 | 9/2012 | Leta et al. ..................... 95/104 |
| 2012/0222555 A1 | 9/2012 | Gupta et al. .................. 95/136 |
| 2012/0255377 A1 | 10/2012 | Kamakoti et al. ......... 73/863.23 |
| 2012/0308456 A1 | 12/2012 | Leta et al. ..................... 423/228 |
| 2012/0312163 A1 | 12/2012 | Leta et al. ..................... 95/97 |
| 2013/0061755 A1 | 3/2013 | Frederick et al. ............ 96/110 |
| 2013/0068101 A1 | 3/2013 | Knapp et al. |
| 2013/0225898 A1 | 8/2013 | Sundaram et al. ........... 585/802 |
| 2014/0013955 A1 | 1/2014 | Tammera et al. ............ 96/115 |
| 2014/0060326 A1 | 3/2014 | Sundaram et al. ........... 95/96 |
| 2014/0157986 A1 | 6/2014 | Ravikovitch et al. ........ 95/96 |
| 2014/0208797 A1 | 7/2014 | Kelley et al. ................. 62/611 |
| 2014/0216254 A1 | 8/2014 | Tammera et al. ............ 95/114 |
| 2014/0271394 A1 | 9/2014 | Jiang et al. |
| 2015/0196870 A1 | 7/2015 | Albright et al. |

FOREIGN PATENT DOCUMENTS

| | | | |
|---|---|---|---|
| CA | 2224471 | 10/2000 | ........ B01D 53/047 |
| CA | 2234924 | 12/2001 | ........ B01D 53/047 |
| CA | 2237103 | 12/2001 | ........ B01D 53/047 |
| CA | 2228206 | 1/2002 | ........ B01D 53/047 |
| CA | 2357356 | 11/2005 | ........ B01D 53/047 |
| CA | 2616701 | 2/2007 | ........... B01D 53/14 |
| CA | 2423178 | 4/2013 | ........ B01D 15/000 |
| DE | 102009003610 | 11/2009 | ........... F01D 15/10 |
| EP | 0225736 | 6/1987 | ............. B01D 53/04 |
| EP | 0257493 | 2/1988 | ............. B01D 53/04 |
| EP | 0262934 | 4/1988 | ............. B01D 53/04 |
| EP | 0426937 | 5/1991 | ............. B01D 53/04 |
| EP | 1004341 | 5/2000 | ........ B01D 53/047 |
| EP | 1018359 | 7/2000 | ........ B01D 53/047 |
| EP | 1413348 | 8/2002 | ............. B01D 53/04 |
| EP | 1 459 799 | 9/2004 | |
| EP | 1577561 | 9/2005 | ........... F04D 29/10 |
| EP | 1203610 | 12/2005 | ........ B01D 53/053 |
| EP | 1674555 | 6/2006 | ............. B01D 53/04 |
| EP | 1798197 | 6/2007 | ............ C01B 21/04 |
| EP | 1045728 | 11/2009 | ........... B01D 53/00 |
| EP | 2823872 | 1/2015 | ........ B01D 53/047 |
| FR | 2924951 | 6/2009 | ............. B01D 53/52 |
| GB | 2013101 | 8/1979 | ............. B01D 53/04 |
| JP | 58-114715 | 7/1983 | ............. B01D 53/50 |
| JP | 59-232174 | 12/1984 | ............... C10K 1/32 |
| JP | 60-189318 | 12/1985 | |
| JP | 2002-253818 | 10/1990 | |
| JP | 04-180978 | 6/1992 | ............... C09J 5/00 |
| JP | 2011-169640 | 6/1999 | ............. B01D 53/04 |
| JP | 2011-280921 | 10/1999 | ............... F16K 1/00 |
| JP | 2000-024445 | 8/2001 | ............. B32B 25/08 |
| JP | 2002-348651 | 12/2002 | ............... C23C 2/06 |
| JP | 2006-016470 | 1/2006 | ............. B01D 46/30 |
| JP | 2006-036849 | 2/2006 | ............... C10L 3/10 |
| JP | 2008-272534 | 11/2008 | ............. B01D 53/04 |
| WO | WO1999/043418 | 9/1999 | ............. B01D 53/53 |
| WO | WO2000/035560 | 6/2000 | ............. B01D 53/47 |
| WO | WO2002/024309 | 3/2002 | ............. B01D 53/06 |
| WO | WO2002/073728 | 9/2002 | ............. H01M 8/06 |
| WO | WO2003/031328 | 4/2003 | ............ C01B 13/02 |
| WO | WO2005/032694 | 4/2005 | ............. B01D 53/04 |
| WO | WO2005/070518 | 8/2005 | ............. B01D 53/06 |
| WO | WO2005/090793 | 9/2005 | ........... F04D 29/10 |

(56) References Cited

FOREIGN PATENT DOCUMENTS

| WO | WO2006/017940 | 2/2006 | B01J 8/02 |
| WO | WO2006/074343 | 7/2006 | B01D 53/02 |
| WO | WO2007/111738 | 10/2007 | F25J 3/08 |
| WO | WO2008/143967 | 11/2008 | B01D 53/04 |
| WO | WO2009/003171 | 12/2008 | B01D 53/02 |
| WO | WO2009/003174 | 12/2008 | B01D 53/02 |
| WO | WO2010/081809 | 7/2010 | B01D 53/04 |
| WO | WO2010/123598 | 10/2010 | C10L 3/10 |
| WO | WO2011/139894 | 11/2011 | B01D 53/47 |

OTHER PUBLICATIONS

ExxonMobil Research and Engineering and Xebec (2008) RCPSA-Rapid Cycle Pressure Swing Adsorption—An Advanced, Low-Cost Commercialized H2 Recovery Process, *Brochure*, 2 pages.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Farooq, S. et al. (1990) "Continuous Contercurrent Flow Model for a Bulk PSA Separation Process," *AIChE J.*, v36 (2) p. 310-314.

FlowServe (2005)"Exceeding Expectations, US Navy Cuts Maintenance Costs With Flowserve GX-200 Non-Contacting Seal Retrofits," *Face-to-Face*, v17.1.

GE Oil & Gas (2007) "Dry Gas Seal Retrofit," Florene, Italy, www.ge.com/oilandgas, 4 pgs.

Hopper, B. et al. (2008) "World's First 10,000 psi Sour Gas Injection Compressor," *Proceedings of the 37th Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Rameshni, Mahin "Strategies for Sour Gas Field Developments," *Worley Parsons-Brochure*, 20 pgs.

Reyes, S. C. et al. (1997) "Frequency Modulation Methods for Diffusion and Adsorption Measurements in Porous Solids," *J. Phys. Chem. B.* v101, pp. 614-622.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Realiability in Centrifugal Compressors," *Dresser-Rand, Tech. Paper 134*, 15 pages.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

* cited by examiner

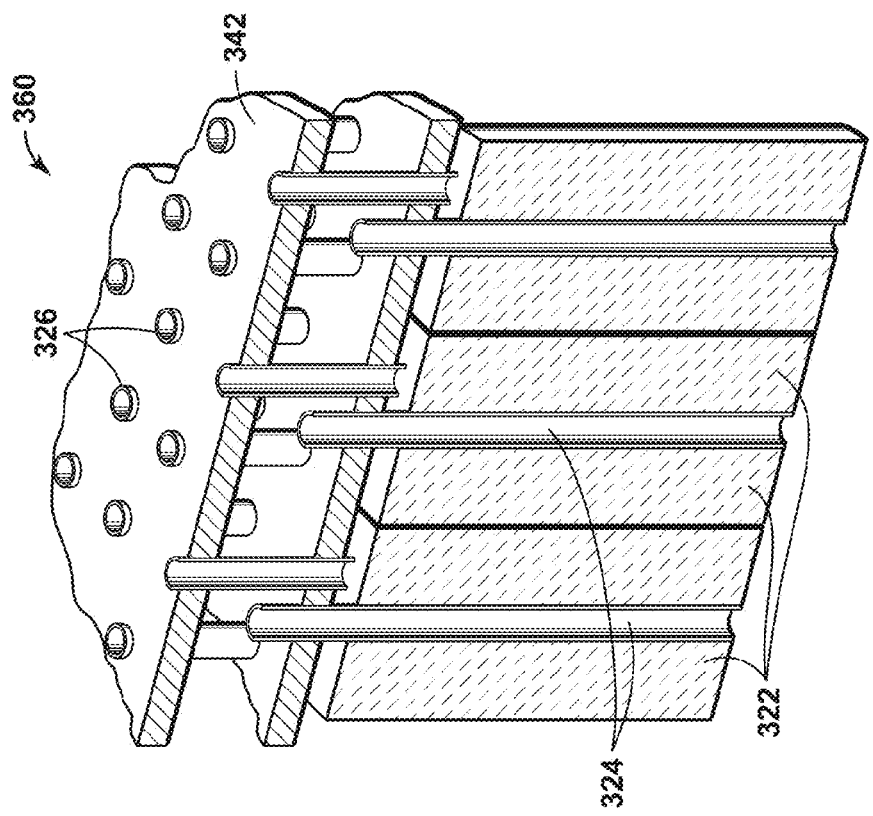
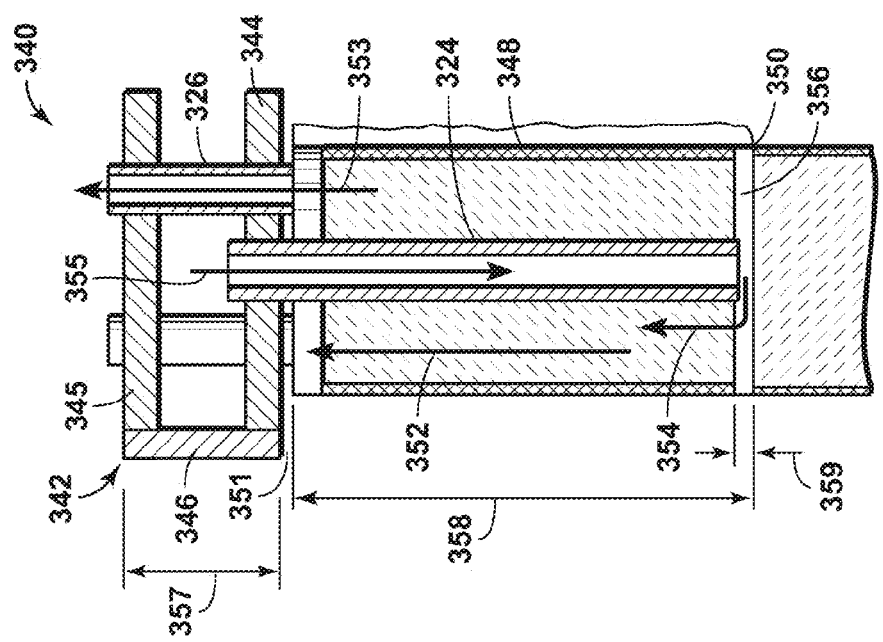
FIG. 3C
FIG. 3D

APPARATUS AND SYSTEM FOR SWING ADSORPTION PROCESSES RELATED THERETO

CROSS REFERENCE TO RELATED APPLICATIONS

This application claims the priority benefit of U.S. Patent Application 62/162,186 filed May 15, 2015 entitled APPARATUS AND SYSTEM FOR SWING ADSORPTION PROCESSES RELATED THERETO, the entirety of which is incorporated by reference herein.

FIELD

The present techniques relate to a system associated with a swing adsorption process. In particular, the system includes an adsorbent bed unit whose configuration includes a mid-bed purge system.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. The adsorbent material is then typically purged and repressurized. Then, the adsorbent material is ready for another adsorption cycle.

The swing adsorption processes typically involve adsorption units, which include adsorbent bed units. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms or the like.

Further, various adsorbent bed units may be coupled together with conduits and valves to manage the flow of fluids. Orchestrating these adsorbent bed units involves coordinating the cycles for each of the adsorbent bed unit with other adsorbent bed units in the system. A complete cycle can vary from seconds to minutes as it transfers a plurality of gaseous streams through one or more of the adsorbent bed units.

Unfortunately, conventional swing adsorption processes have certain limitations that are inefficient or do not operate properly for purging the contaminants from the adsorbent beds. That is, the conventional adsorbent bed units provide gas streams from one end or the other end of the adsorbent bed. The purging in conventional systems is time consuming and can be inefficient. For engineered packing, the structure of the bed further complicates the purging of fluids from within the engineered packing if the adsorbent bed is formed into a specific configuration.

Accordingly, there remains a need in the industry for apparatus, methods, and systems that provide an enhanced adsorbent bed unit. The present techniques provide a method and apparatus that overcome one or more of the deficiencies discussed above. In particular, the present techniques provide an adsorbent bed unit that includes a mid-bed purge system that enhances the operations of the swing adsorption processes to provide gas from a location other than the end of the adsorbent bed.

SUMMARY OF THE INVENTION

In one or more embodiments, the present techniques include an adsorbent bed unit for a cyclical swing process. The adsorbent bed unit includes: a housing having an interior region; one or more contactors disposed in the interior region, each of the one or more contactors having a first portion and a second portion, wherein the first portion is disposed upstream of the second portion, wherein the first portion comprises a first adsorbent material and the second portion comprises a second adsorbent material, and wherein each of the one or more contactors have fluid flow passages through the first adsorbent material and the second adsorbent material; and each of the one or more contactors have at least one gas purge inlet conduit disposed within the first portion and configured to provide a purge flow passage to a mid-purge distribution zone between the first portion and the second portion, wherein the purge flow passage within the at least one gas purge inlet conduit is fluidly separated and independent of the fluid flow passages through the first adsorbent material. The adsorbent bed unit may also include a plenum closure component disposed upstream of the first portion and having a distribution zone, wherein the plenum closure component is configured to: provide fluid communication between the distribution zone and the mid-purge distribution zone via the at least one gas purge inlet conduit; provide fluid communication between a primary fluid zone formed between the first portion and the plenum closure component and a location external to the housing; and isolate direct fluid communication between the distribution zone and the primary fluid zone. Also, the plenum closure component comprises one or more outlet conduits disposed adjacent to the first portion in the primary fluid zone and configured to provide fluid communication between the primary fluid zone and the external location. The mid-purge distribution zone may be positioned at a location that is between 10% and 60% of the length of the adsorbent bed, or at a location that is between 20% and 40% of the length of the adsorbent bed.

Further, in one or more embodiments, a method of manufacturing a contactor is described. The method comprises: fabricating a first portion of a contactor, wherein the first portion is configured to provide first fluid flow passages through a first adsorbent material, wherein the first portion has a gas purge inlet conduit that is configured to provide a purge flow passage through the first portion and the purge flow passage is fluidly separated and independent of the fluid flow passages through the first portion; fabricating a second portion of the contactor comprising a second adsorbent material, wherein the second portion is configured to provide second fluid flow passages through the second adsorbent material; and securing the first portion to the second portion, wherein the gas purge inlet conduit is configured to provide a purge flow passages to a mid-purge distribution zone between the first portion and the second portion, wherein the purge flow passage is fluidly separated and independent of the first fluid flow passages.

In yet other embodiments, a method of manufacturing an adsorbent bed unit is described. The method comprises: fabricating a plurality of contactors, wherein each of the plurality of contactors comprises: a first portion configured to provide first fluid flow passages through a first adsorbent material, wherein the first portion has a gas purge inlet conduit configured to provide a purge flow passage through the first portion and the purge flow passage is fluidly separated and independent of the first fluid flow passages through the first portion; a second portion comprising a second adsorbent material, wherein the second portion is configured to provide second fluid flow passages through the second adsorbent material; wherein the first portion is secured to the second portion; and wherein the gas purge inlet conduit is configured to provide a purge flow passage to a mid-purge distribution zone between the first portion and the second portion, wherein the purge flow passage is fluidly separated and independent of the fluid flow passages; securing two or more plurality of contactors to each other to forma an assembly of contactors; constructing an adsorbent bed unit housing, wherein the an adsorbent bed unit housing has an interior region; and disposing the assemble of contactors into an adsorbent bed unit housing.

A cyclical swing adsorption process for removing contaminants from gas feed streams comprising the steps of: passing a gaseous feed stream at a feed pressure through an adsorbent bed unit having an adsorbent contactor to separate one or more contaminants from the gaseous feed stream to form a product stream, wherein the adsorbent contactor has a first portion and a second portion; interrupting the flow of the gaseous feed stream; performing a depressurization step, wherein the depressurization step reduces the pressure within the adsorbent bed unit; performing a purge step, wherein the purge step reduces the pressure within the adsorbent bed unit and wherein the purge step involves passing a purge stream to a mid-purge distribution zone between first portion and the second portion; performing a re-pressurization step, wherein the re-pressurization step increases the pressure within the adsorbent bed unit; and repeating the steps a) to e) for at least one additional cycle. The method may include: passing the purge stream through a distribution zone in a plenum closure component disposed upstream of the first portion prior to passing the purge stream to the mid-purge distribution zone via a at least one gas purge inlet conduit and/or passing the product stream through a primary fluid zone in a plenum closure component disposed upstream of the first portion, wherein the product stream is isolate direct fluid communication between the distribution zone and the primary fluid zone.

BRIEF DESCRIPTION OF THE FIGURES

The foregoing and other advantages of the present disclosure may become apparent upon reviewing the following detailed description and drawings of non-limiting examples of embodiments.

FIGS. 3A, 3B, 3C and 3D are diagrams of exemplary components of an adsorbent bed unit having a mid-bed purge system in accordance with an embodiment of the present techniques.

DETAILED DESCRIPTION OF THE INVENTION

Figure 1:
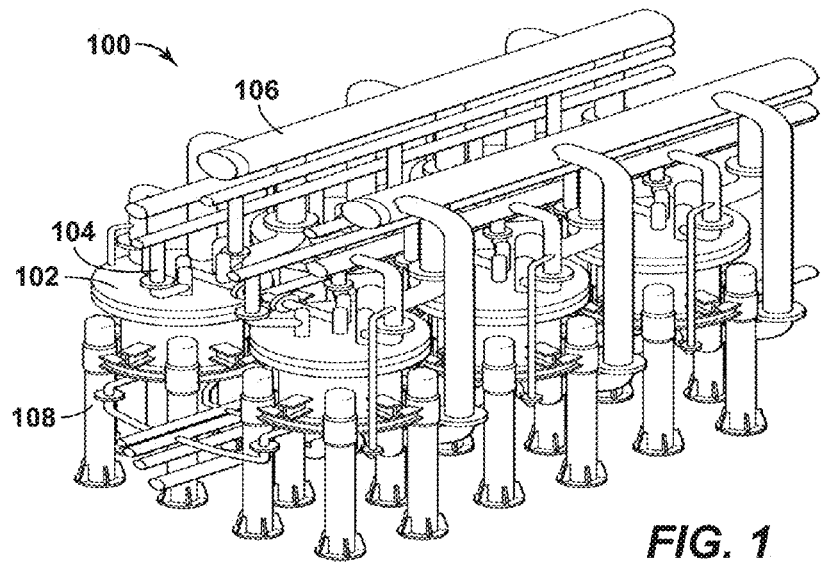
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

The present techniques relate to an adsorbent bed unit having a mid-bed purge system. The mid-bed purge system may include a compact multi-purpose distribution chamber (e.g., the interior of a plenum closure component) configured to transfer a volume of stored fluid through a feed conduit. The distribution chamber also includes an integrated conduit for transferring a separate stream through a portion of the adsorbent bed.

In certain embodiments, the adsorbent bed unit may include different components that are utilized to enhance operations. For example, the adsorbent bed unit may include a gas inlet conduit (e.g., fluid inlet), which is fabricated as an integral component of the mid-bed purge system. Further, a distribution chamber and associated conduits can be fabricated in a sequence that provides a compact configuration with minimal moving components. This configuration may lessen internal hardware utilized and lessen complications in fabrication and reliability by utilizing such components in this configuration.

The configuration of the mid-bed purge system balances the efficiency of the mid-system purge with the internal dead space volume. That is, the mid-system purge system is configured to increase efficiency of the purge step, while minimizing any changes to the internal dead space volume of the unit, if any. Accordingly, the mid-bed purge system may be configured to provide a separate purge gas stream into the absorbent bed at a location, such as a mid-purge distribution zone. As a result, the present techniques provide a mid-bed purge configuration that introduces a separate fluid stream into the absorbent bed at a location referred to as the mid-purge distribution zone, which is different from the ends of the absorbent bed. The mid-purge distribution zone may be positioned at a location along the length of the contactor or adsorbent bed between a first end and a second end as indicated from the primary fluid flow through the contactor or adsorbent bed (e.g. along the path of the feed fluid or other primary fluid being subjected to the adsorption process). The location of mid-purge distribution zone may be determined based on the inlet gas stream, the purge stream, the adsorbent material, contaminants being removed from the respective adsorbent material via the purge step or a combination thereof.

As an example, an adsorbent bed may have fluids (e.g., feed stream) that flow from a first end to a second end along a length of the adsorbent bed. The mid-purge distribution zone may be disposed between a first portion of the adsorbent bed and a second portion of the adsorbent bed. In certain embodiments, the mid-purge distribution zone may be positioned at a location that is substantially at the center of the adsorbent bed, between the first end and the second end. In other configurations, the mid-purge distribution zone may be positioned at a location that is between 10% and 60% of the length of the adsorbent bed measured from the first end, is between 20% and 40% of the length of the adsorbent bed measured from the first end, or is between 25% and 35% of the length of the adsorbent bed measured from the first end. The length of the adsorbent bed may be between 12 inches and 120 inches (0.3048 meters (m) and 3.048 m); between 18 inches and 60 inches (0.4572 m and 1.524 m); and between 24 inches and 48 inches (0.6096 m and 1.2192 m).

Alternatively, in other embodiments, the mid-purge distribution zone may include multiple zones that are distributed at various locations along the length of the adsorbent bed. For example, two mid-purge distribution zones may be utilized with a first mid-purge distribution zone being disposed between a first portion of the adsorbent bed and a second portion of the adsorbent bed and a second mid-purge distribution zone being disposed between a third portion of the adsorbent bed and the second portion of the adsorbent bed. In certain embodiments, the mid-purge distribution zone may be positioned at a location that is substantially equally spaced from the nearest respective ends of the adsorbent bed and the other mid-purge distribution zone. In other configurations, the first mid-purge distribution zone may be positioned at a location that is between 10% and 40% of the length of the adsorbent bed measured from the first end, while the second mid-purge distribution zone may be positioned at a location that is between 60% and 90% of the length of the adsorbent bed measured from the first end; or a first mid-purge distribution zone may be positioned at a location that is between 20% and 35% of the length of the adsorbent bed measured from the first end, while the second mid-purge distribution zone may be positioned at a location that is between 65% and 80% of the length of the adsorbent bed measured from the first end. As may be appreciated, other configurations may include three mid-purge distribution zones, four mid-purge distribution zones or other numbers of mid-purge distribution zones.

The mid-purge distribution zone may divide the adsorbent bed into a different portions based on the number of mid-purge distribution zones. As may be appreciated, the different portions may include the same type of adsorbent material or different portions may include different types of adsorbent material. That is, one configuration may include one adsorbent material for each of the different portions of the adsorbent bed, while another configuration may include a first adsorbent material and a second portion may include a second adsorbent material. If different materials are utilized, each may be selected to remove certain contaminates or to further enhance the purge step.

In one or more embodiments, the present techniques can be used for any type of swing adsorption process. Non-limiting swing adsorption processes for which the present invention can be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes, such as pressure/temperature swing adsorption. Exemplary kinetic swing adsorption processes are described in U.S. Pat. Nos. 7,959,720, 8,545,602, 8,529,663, 8,444,750, 8,529,662 and U.S. Patent Publication No. 2014/0013955, which are each herein incorporated by reference in their entirety.

The present techniques provide various enhancements to swing adsorption systems. For example, the enhancements may include uniformly distributed gas streams at select contactor or adsorbent bed locations. Also, the mid-system purge may be utilized to enhance the efficiency of the purge step and to lessen the period of time involved with the purge step. Further, the mid-bed purge system may lessen internal hardware and lessen complications in fabrication and reliability. The present techniques may be further understood with reference to the FIGS. 1 to 6F below.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 108, which are dedicated to the adsorbent bed unit and may be dedicated to one or more step in the swing adsorption process.

As an example, which is discussed further below in FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
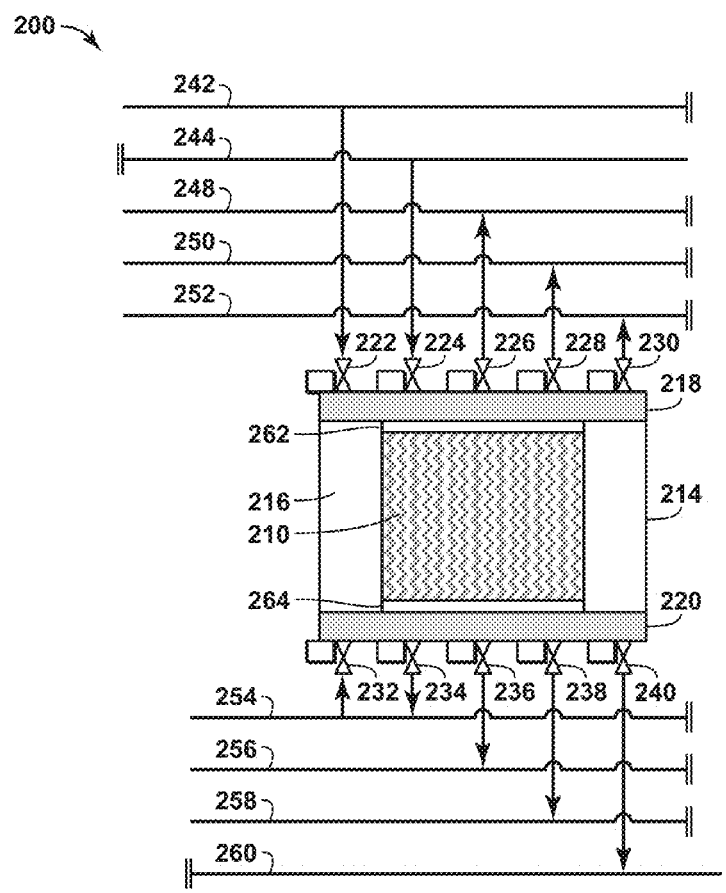
FIG. 2 is a diagram of a portion of an adsorbent bed unit having associated valve assemblies and manifolds in accordance with an embodiment of the present techniques.

FIG. 2 is a diagram 200 of a portion of an adsorbent bed unit having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure from 0 bar a (bar absolute) to 100 bar a within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not shown) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. The stem element may be connected to an actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In swing adsorption processes, the cycle involves two or more steps that each has a certain time interval, which are summed together to be the cycle time. These steps include regeneration of the adsorbent bed following the adsorption step using a variety of methods including pressure swing, vacuum swing, temperature swing, purging (via any suitable type of purge fluid for the process), and combinations thereof. As an example, a PSA cycle may include the steps of adsorption, depressurization, purging, and re-pressurization. When performing the separation at high pressure, depressurization and re-pressurization (which may be referred to as equalization) is performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

To provide certain enhancements, the adsorbent bed unit may include a mid-bed purge system. The mid-bed purge system may include one or more plenum closure components, such as plenum closure components 262 and 264, gas purge inlets or conduits (not shown) and one or more gas purge passages (not shown). The plenum closure components may be divided into different regions and/or the gas purge inlets or conduits may be provided to different locations in the adsorbent bed 210. Exemplary components of the adsorbent bed unit are shown in FIGS. 3A to 3D.

Figure 3B:
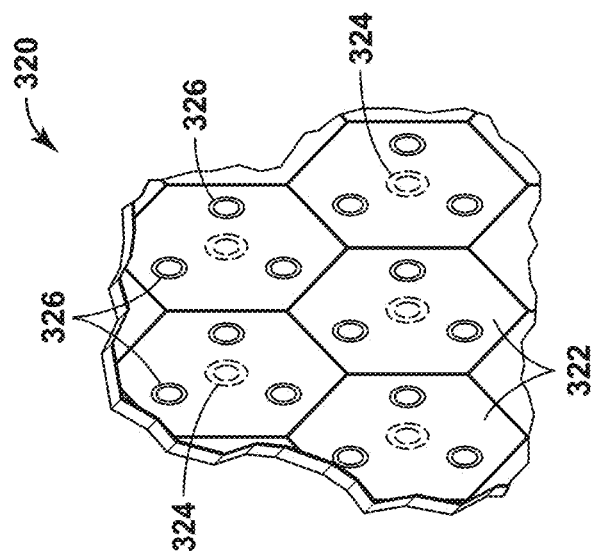
Figure 3A:
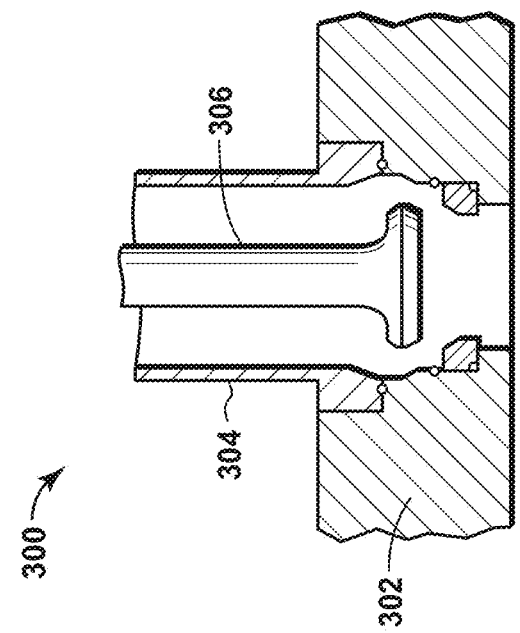

FIGS. 3A, 3B, 3C and 3D are diagrams 300, 320, 340, and 360 of exemplary components of an adsorbent bed unit having a mid-bed purge system in accordance with an embodiment of the present techniques. FIG. 3A is a diagram 300 of an exemplary assembly of poppet valve assembly 306 and vessel head assembly 304 in the adsorbent bed unit 302 in accordance with an embodiment of the present techniques. In the diagram 300, the poppet valve assembly 306 and vessel head assembly 304, which may be one of the valves assemblies 222 to 240 of FIG. 2, may be utilized to manage the flow of fluids into or out of the adsorbent bed unit 302.

FIG. 3B is a diagram 320 of an exemplary view of an assembly of contactors 322 in the adsorbent bed unit 302 of FIG. 3A. In this diagram 320, each of the contactors 322 has a gas purge inlet conduit 324 (e.g., a tubular member or other suitable channel that provides isolated flow through the adsorbent material) located at the center of the hexagon shape of the respective contactor 322. While the contactors are formed into a hexagon shape, any shape may be utilized, such as a triangular, square, circular or other suitable triangular shape. The contactors 322 may also include one or more gas outlets, such as gas outlet conduit 326, which may be a tubular member or other suitable mechanism for managing the flow of a fluid. The gas outlets may be disposed adjacent to the adsorbent bed to manage the fluid flow from the adsorbent bed to the associated conduits or manifold. For example, each of the contactors 322 in this configuration includes three gas outlets and one gas purge inlet conduit 324. These gas outlets may be evenly spaced to provide uniform flow.

FIG. 3C is a diagram 340 of a cross section of a portion of an exemplary contactor 322 and associated plenum closure component 342 in the assembly of contactors in FIG. 3B. In diagram 340, the adsorbent bed unit has a contactor 322 disposed in a liner 348 and adjacent to the plenum closure component 342. The contactor 322 may be formed in a hexagon shape along with the liner 348 and the liner may be secured to the contactor 322 via an external weld 350. The plenum closure component 342 has a plenum bottom plate 344, plenum top plate 345 and plenum side plate 346. The plenum closure component 342 is configured to separate the fluids from the contactor 322 from the fluids passing through other conduits, such as the gas purge inlet conduit 324. For example, the plenum closure component 342 provides isolated flow locations at the end of the contactor 322, but the purge fluid is introduced into the contactor 322 at the gas purge passage 356, which is the mid-purge distribution zone.

In this diagram 340, the fluid flow through the contactor 322 and the plenum closure component 342 are shown by various arrows. For example, the passage through the plenum closure component 342 via the gas outlet conduit 360 may be used to as a passage for fluids passing through the adsorbent material or bed of the contactor 322, as indicated by arrows 352 and 353. The passage within the plenum closure component 342 is the passage for fluids into the gas purge inlet conduit 324 and ultimately into the adsorbent material of the contactor 322, as indicated by arrows 354 and 355. The flow passages (e.g., fluid flow passages) along arrows 352 and 353 are fluidly separated and independent of the flow passages (e.g., purge flow passage) along arrow 355 for the length of the gas purge inlet conduit 324, but are shared within the adsorbent material of the contactor 322, as shown by arrow 354. Further, the flow passages along arrows 352, 353, 354 and 355 are substantially parallel with the exception of portion of the flow through the gas purge passage 356.

The mid-bed purge system includes the plenum closure component 342, gas purge inlet conduit 324 and gas purge passage 356. The gas purge inlet conduit 324 may be configured to provide a passage or channel through the adsorbent material to a certain depth 358 within the contactor 322. The depth 358 is based on the location of the mid-purge distribution zone, which may be positioned at a location that is between 10% and 60% of the length of the contactor 322 measured from the first end (with the length being the depth 358 plus the portion of the contactor 322 to the second end which is not shown in this figure). Other embodiments may include depths between 20% and 40% of the length of the contactor 322 measured from the first end, or is between 25% and 35% of the length of the contactor 322 measured from the first end. As an example, the depth 358 may be 8 inches (0.2032 m).

Also, the gas purge passage 356 may be configured to distribute the purge fluid in a uniform manner into the adsorbent material of the contactor 322. The gas purge passage 356 may be a passage having a height 359. The height 359 may be based on the purge fluid being provided to the mid-purge distribution zone, the cross section dimensions of the contactor and any combination thereof. Accordingly, the height 359 may be between 0.10 inches and 1.0 inches (0.00254 m and 0.0254 m), between 0.15 inches and 0.75 inches (0.00381 m and 0.01905 m) and between 0.20 inches and 0.45 inches (0.00508 m and 0.01143 m). As a specific example, the gas purge passage 356 may be a passage having a height 359 of 0.25 inches (0.00635 m).

Further, the plenum closure component 342 may be configured to distribute the purge fluid in a uniform manner into the contactor 322 via the distribution zone of the plenum closure component 342 that has a depth 357. The depth 357 may be based on the purge fluid being provided to the mid-purge distribution zone, the volume of purge fluid to be utilized in the purge step, the cross section dimensions of the contactor and any combination thereof. Accordingly, the depth 357 may be between 0.5 inches and 10 inches (0.0127 m and 0.254 m), between 1.0 inches and 7.5 inches (0.0254 m and 0.1905 m) and between 1.5 inches and 5 inches (0.0381 m and 0.127 m). As an example, the depth 357 may be a passage having a length of 2.75 inches (0.06985 m).

Along with the distribution zone, the plenum closure component 342 is configured to manage the flow of fluids from the end of the contactor 322 via the primary fluid zone. This primary fluid zone 351 is formed between the end of the contactor 322 and the plenum bottom plate 344 of the plenum closure component 342. The number and configuration of outlet conduits may be adjusted to manage the flow of the inlet stream into the primary fluid zone or from the primary fluid zone to a location external to the adsorbent bed unit. The specific configuration of the outlet conduits and the specific depth of the primary fluid zone may be based on the primary fluids (e.g., feed streams, product streams, waste streams and purge streams) being provided to and from the contactor, the uniformity pattern of the fluids, the volume of primary fluid zone, the cross section dimensions of the contactor and any combination thereof. Accordingly, the depth of the primary fluid zone may be between 0.1 inches and 5 inches (0.00254 m and 0.127 m), between 0.2 inches and 4 inches (0.00508 m and 0.1016 m) and/or between 0.4 inches and 3 inches (0.00381 m and 0.01905 m). As an example, the depth of the primary fluid zone may be 0.25 inches (0.00635 m).

FIG. 3D is a diagram 360 of a partial view of the exemplary assembly of contactors 322 of FIGS. 3B and 3C. In the diagram 360, the adsorbent bed unit has various contactors 322 disposed adjacent to the plenum closure component 342 and gas purge inlet conduits 324 and gas outlet conduits 326 associated with the plenum closure component 342. The contactor 322 may be formed in a hexagon shape, while the plenum closure component 342 may be formed in to a cylindrical shape or other suitable shape. For example, the plenum closure component 342 may be configured to be dedicated to manage the fluid flow for one of the contactors in the assembly of contactors or may be utilized to manage the fluid flow for two or more of the contactors in the assembly of contactors.

Beneficially, the configuration provides various enhancements. For example, the plenum closure component provides flow management, while minimizing the dead volume. Also, the configuration can be fabricated in a manner that provides a compact configuration with minimal or no moving components. That is, this configuration distributes the flow and may lessen hardware spacing constrains. Further, the configuration lessens the complications by providing components that are easy to fabricate and the plenum closure component lessens spacing issues for operation and maintenance of the unit.

Figure 4A:
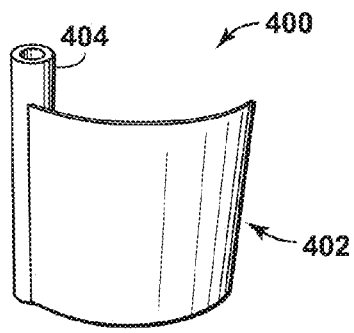
FIGS. 4A, 4B, 4C, 4D and 4E are diagrams of forming a contactor having a mid-bed purge system in accordance with an embodiment of the present techniques.

FIGS. 4A, 4B, 4C, 4D and 4E are diagrams 400, 410, 420, 430 and 440 of forming a contactor having a mid-bed purge system in accordance with an embodiment of the present techniques. FIG. 4A is a diagram 400 of a sheet of material 402 which is disposed around a gas inlet conduit 404, which may be the gas purge inlet conduit 324 of FIGS. 3B to 3D. In this diagram 400, the sheet of material 402 may be secured (e.g., via a weld or other fastening mechanism) to the gas inlet conduit 404. The materials may be configured to separate a target gas form a gaseous mixture. The material may include an adsorbent material supported on a non-adsorbent support. The adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups include primary, secondary, tertiary and other non protogenic basic groups such as amidines, guanidines and biguanides.

Figure 4B:
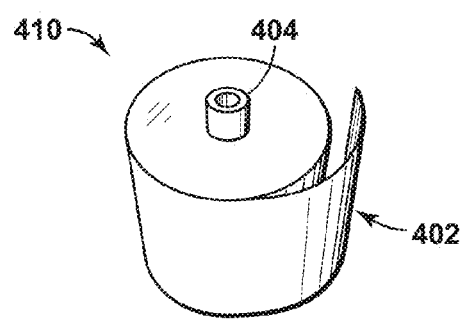

FIG. 4B is a diagram 410 of the sheet of material 402 disposed around a gas inlet conduit 404. In this diagram 410, the sheet of material 402 may be mechanically rolled to a designed size. In other embodiments, the monolith bed may be cast around gas inlet conduit 404 or 3D printing may be used to form the material around the as inlet conduit.

Figure 4C:
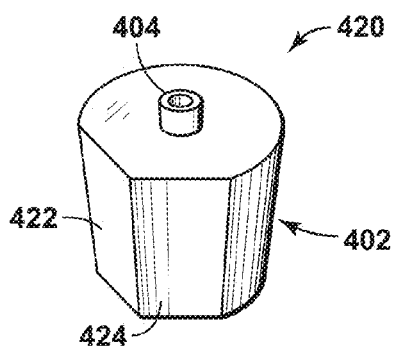

FIG. 4C is a diagram 420 of the sheet of material 402 disposed around a gas inlet conduit 404 and further shaped along two surfaces 422 and 424. In this diagram 420, a machining technique, such as electrical discharge machining (EDM) (e.g., wire trimmed), may be performed on the sheet of material 402 to form two surfaces of a hexagonal shape.

Figure 4D:
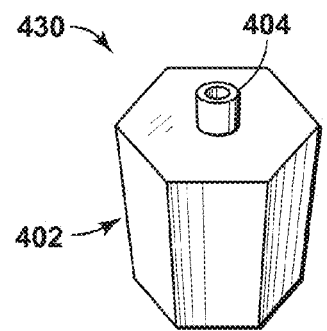

FIG. 4D is a diagram 430 of the sheet of material 402 which is disposed around a gas inlet conduit 404 in a completed hexagonal contactor. In this diagram 430, the sheet of material 402 has been formed into the designed shape, which is a hexagonal shape. The hexagon shape may be preferred because of the ability to pack objects into a more efficient configuration that lessens the void space (e.g., direct loss or valuable internal area). However, it should be noted that other suitable shapes may be formed as well. For example, the contactor may be formed into a circular, square or rectangular shape.

Figure 4E:
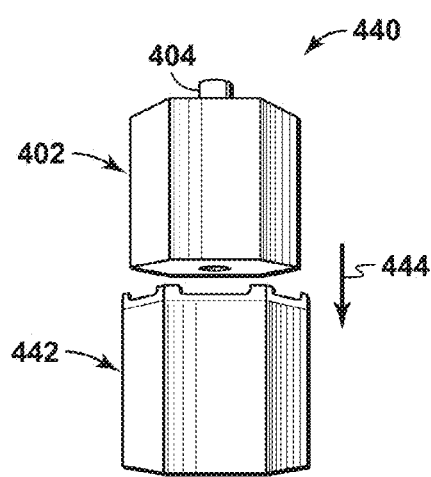

FIG. 4E is a diagram 440 of the hexagonal adsorbent material being disposed into the liner 442 to form the contactor. In this diagram 440, the shaped sheet of material 402 disposed around a gas inlet conduit 404 is inserted into the liner 442, as shown by the arrow 444.

Figure 5A:
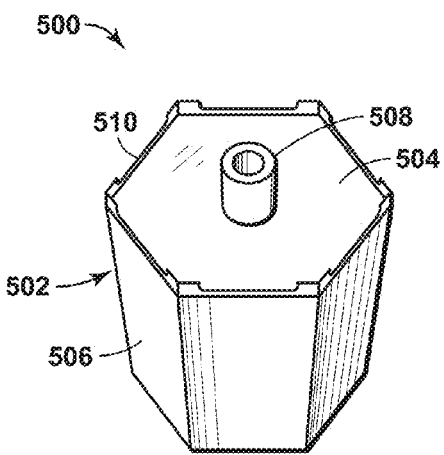
FIGS. 5A, 5B, 5C and 5D are diagrams of forming an assembly of contactors for the adsorbent bed unit having a mid-bed purge system in accordance an embodiment of the present techniques.

FIGS. 5A, 5B, 5C and 5D are diagrams 500, 520, 540 and 560 of forming an assemble of contactors for the adsorbent bed unit having a mid-bed purge system in accordance an embodiment of the present techniques. Specifically, FIG. 5A is a diagram 500 of a three-dimensional partial view of a portion of the contactor 502, which may be the contactor in FIG. 4E. In this configuration, the portion of the contactor 502 has an absorbent material 504, a liner 506, an inlet gas conduit 508, and a sealing component 510. The sealing component 510 may be disposed between the absorbent material 504 and liner 506. The sealing component 510 may be used to prevent flow between the outer surface (e.g., external surface, which is opposite the inlet gas conduit 508) of the absorbent material 504 and the liner 506. The sealing component 510 may also bond the absorbent material 504 to the liner 506. The sealing component 510 may include a bonding agent that is a polymer-based composition, e.g., thermoplastic and thermosets, adhesive compositions, such as contact adhesives or hot melt adhesives, rubber, i.e., natural or synthetic, elastomers, or combination thereof. Also, the bonding agent may include a heavy petroleum wax (e.g., Apiezon), bitumen, asphalt, etc. and the like. Exemplary components are described in U.S. Patent Application Publication No. 2014/0013955, which is herein incorporated by reference in their entirety.

Figure 5B:
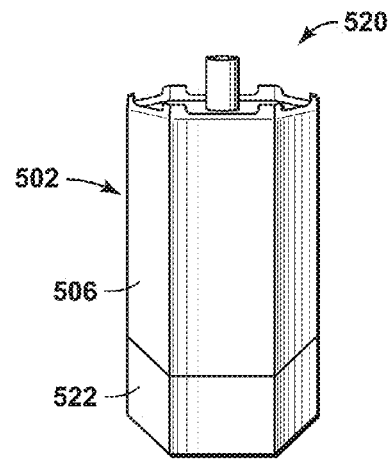

FIG. 5B is a diagram 520 of a three-dimensional view of the portion of the contactor 502 coupled to another portion of the contactor 522 (e.g., the remaining portion of the contactor). The other portion of the contactor 522 may be formed of the adsorbent material, another adsorbent material, or may include center conduit that provides flow for certain fluids. The portions of the contactor 502 and 522 may be coupled together via one or more welds between the different portions, welds between the different liners (e.g., liner 506 and the liner for the remaining portion of the contactor), welds between one or more of the different portions and the liner or other suitable coupling mechanisms. The remaining portion of the contactor 522 may be 28 inches (0.7112 m) in length, as an example.

Figure 5C:
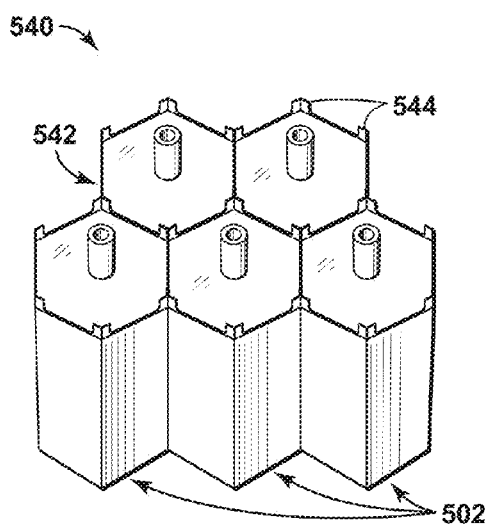

FIG. 5C is a diagram 540 of a three-dimensional partial view of a plurality of contactors, which may be the contactor of FIGS. 5A and 5B, into an assembly of contactors. The contactors 502 may be welded together into the assembly of contactors via one or more welds, such as weld 542. The welds may be formed on tapered tabs, such as tabs 544, from the liners of the respective contactors 502. These tabs 544 may also be utilized with the plenum bottom plate to form the primary fluid zone.

Figure 5D:
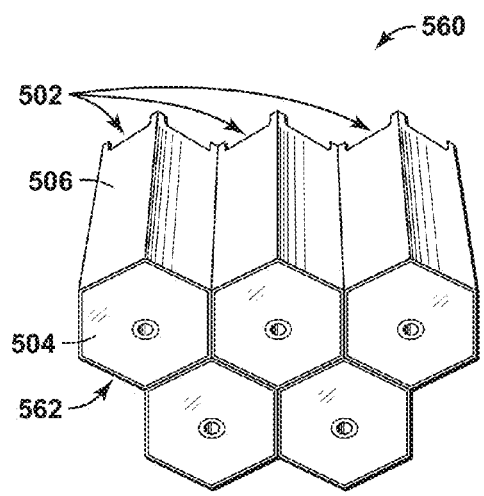

FIG. 5D is a diagram 560 of another three-dimensional partial view of the assembly of contactors 502, which may be the contactors 502 of FIG. 5C. In this diagram 560, the contactors 502 may also be welded together into the assembly of contactors 502 via one or more welds (not shown). In addition, each of the contactors 502 may include a tab 562 formed from a recess of the respective liner 506 to the absorbent material 504 (e.g., an extension of the liner beyond the adsorbent material). The tab may be used to provide the gas purge passage, such as gas purge passage 356. The gas purge passage may also include additional spacers (not shown) to maintain the structure of the passage.

As may be appreciated, this fabrication process may be adjusted to provide for two or more mid-purge distribution zones that are distributed at various locations along the length of the adsorbent bed. For example, two mid-purge distribution zones may be utilized with a first mid-purge distribution zone being disposed between a first portion of the adsorbent bed and a second portion of the adsorbent bed and a second mid-purge distribution zone being disposed between a third portion of the adsorbent bed and the second portion of the adsorbent bed. In this configuration, two portions of the contactors (e.g., the first portion and the third portion) may be fabricated as noted above, while the second potion may be fabricated of adsorbent material, as noted above, as well. Alternatively, the inlet conduit may include additional passages, such as divider or another conduit disposed within the purge inlet conduit. For this configuration, a first passage may be distributed between the first and second portions, while the second passage may be distributed between the second and third portions. Similar techniques may be utilized to provide three or more mid-purge distribution zones, which may even combine the above techniques.

Figure 6A:
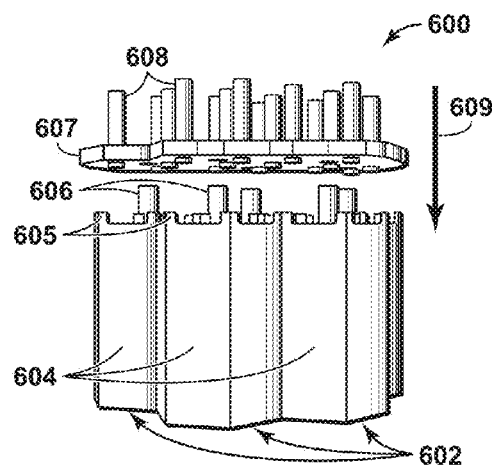
FIGS. 6A, 6B, 6C, 6D, 6E and 6F are diagrams of an exemplary adsorbent bed unit having a mid-bed purge system in accordance with an embodiment of the present techniques.

FIGS. 6A, 6B, 6C, 6D, 6E and 6F are diagrams 600, 610, 620, 630, 640 and 650 of a portion of an exemplary adsorbent bed unit having a mid-bed purge system in accordance with an embodiment of the present techniques. FIG. 6A is a diagram 600 of a three-dimensional view of a portion of the assembly of contactors 602, which may be the assembly of contactors of FIGS. 5C and 5D, along with the plenum bottom plate 607. In this configuration, each of the assembly of contactors 602 has an absorbent material (not shown), a liner 604, and an inlet gas conduit 606. Also, in this diagram 600, the plenum bottom plate 607 may include one or more purge gas outlets 608 and an opening for each of the inlet gas conduits 606. The plenum bottom plate 607 may be welded to the purge gas outlets 608 prior to installation or may be fabricated as a single component. The plenum bottom plate 607 may lower, as shown by arrow 609 to rest on the liner tabs 605.

Figure 6B:
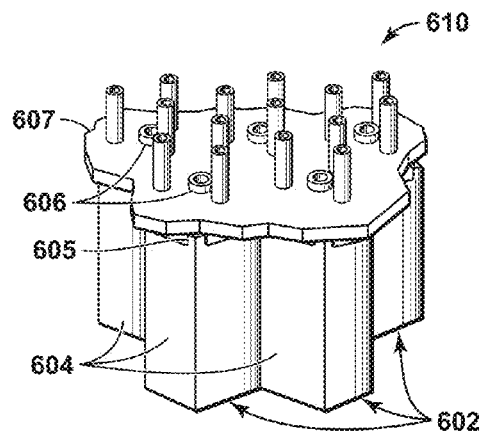

FIG. 6B is a diagram 610 of a three-dimensional view of a portion of the assembly of contactors 602 of FIG. 6A once the plenum bottom plate 607 is lowered onto the tabs 605 of the liners 604. Once lowered, a sealing component and/or a weld may be disposed between the plenum bottom plate 607 and the inlet gas conduits 606. Further, one or more of the tabs 605 may also be secured (e.g., welded) to the plenum bottom plate 607.

Figure 6C:
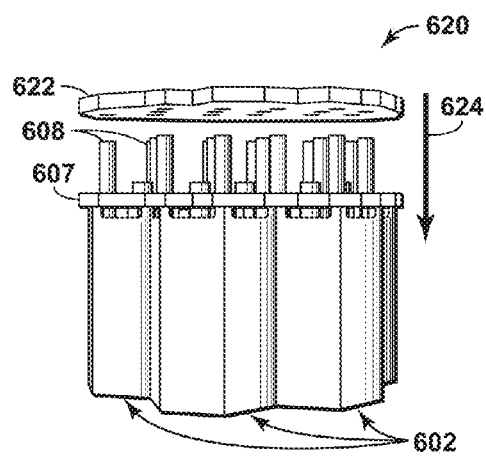

FIG. 6C is a diagram 620 of a three-dimensional view of a portion of the assembly of contactors 602 of FIGS. 6A and 6B with the plenum top plate 622. In this configuration, the plenum top plate 622 may include one or more openings for the purge gas outlets 608. The plenum top plate 622 may lower, as shown by arrow 624 to rest on the purge gas outlets 608. The purge gas outlets 608 may include a plenum side plate (not shown) and/or a tab or spacer (not shown) that is utilized to position the plenum top plate 622 a specific distance from the bottom plenum plate 607. The plenum top plate 622 may be welded to the plenum side plate prior to installation or may be fabricated as a single component.

Figure 6D:
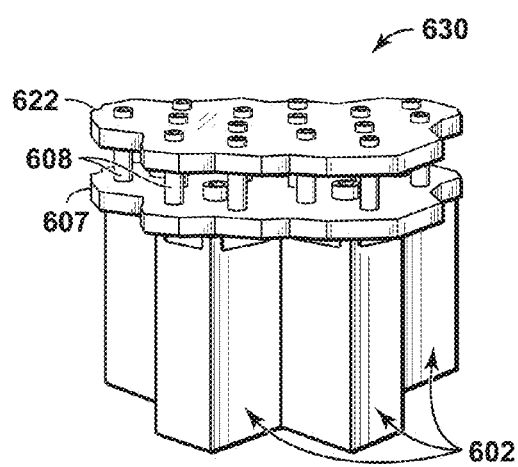

FIG. 6D is a diagram 630 of a three-dimensional view of a portion of the assembly of contactors 602 of FIG. 6C once the plenum top plate 622 is lowered onto the purge gas outlets 608. Once lowered, a sealing component and/or a weld may be disposed between the plenum top plate 622 and the purge gas outlets 608. Further, the plenum bottom plate 607 may be secured (e.g., welded) to plenum side plate (not shown) and/or the plenum top plate 622.

Figure 6E:
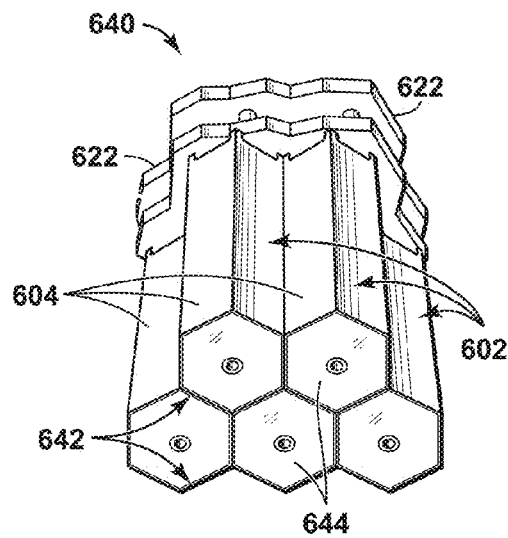

FIG. 6E is a diagram 640 of a three-dimensional view of a portion of the assembly of contactors 602 of FIG. 6D once the plenum top plate 622 is secured to the purge gas outlets. In this configuration, the tab 642 may be formed from a recess of the respective liner 604 to the absorbent material 644.

Figure 6F:
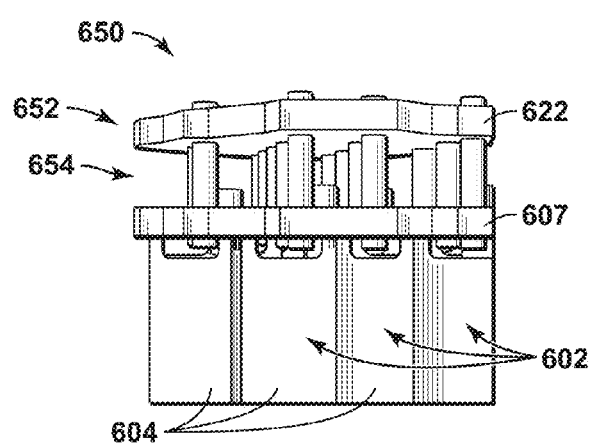

FIG. 6F is a diagram 650 of a three-dimensional view of a portion of the assembly of contactors 602 of FIGS. 6D and 6E with the plenum closure component 652 (e.g., plenum bottom plate 607, plenum top plate 622 and plenum side plate (not shown) coupled to the assembly of contactors 602 and liners 604. In this configuration, the plenum closure component 652 may provide a passage 654 that provides access to the respective inlet gas conduits 606.

In one or more embodiments, the adsorbent bed unit may be utilized to separate contaminants from a feed stream. The method may include passing a gaseous feed stream at a feed pressure through an adsorbent bed unit having an adsorbent contactor to separate one or more contaminants from the gaseous feed stream to form a product stream, wherein the adsorbent contactor has a first portion and a second portion; interrupting the flow of the gaseous feed stream; performing a depressurization step, wherein the depressurization step reduces the pressure within the adsorbent bed unit; performing a purge step, wherein the purge step reduces the pressure within the adsorbent bed unit and wherein the purge step involves passing a purge stream to a mid-purge distribution zone between first portion and the second portion; performing a re-pressurization step, wherein the re-pressurization step increases the pressure within the adsorbent bed unit; and repeating the steps a) to e) for at least one additional cycle. Further the method may include that the mid-purge distribution zone is positioned at a location that is between 10% and 60% of the length of the adsorbent bed; that the mid-purge distribution zone is positioned at a location that is between 20% and 40% of the length of the adsorbent bed; the further step of passing the purge stream through a distribution zone in a plenum closure component disposed upstream of the first portion prior to passing the purge stream to the mid-purge distribution zone via at least one gas purge inlet conduit; and the further step of passing the product stream through a primary fluid zone in a plenum closure component disposed upstream of the first portion, wherein the product stream isolates direct fluid communication between the distribution zone and the primary fluid zone.

Further, in one or more embodiments, the adsorbent bed unit may include an adsorbent bed that can be used for the separation of a target gas form a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the point or place at which a feed stream enters the contactor and the point or place at which a product stream leaves the contactor. In the contactor, the adsorbent is incorporated into the wall of the flow channel.

Non-limiting examples of adsorbent materials that can be used with the method and system include high surface area (>10 m2/gm and preferably >75 m2/gm) alumina, microporous zeolites (preferably zeolites with particle sizes <1 mm), other microporous materials, mesoporous materials and ordered mesoporous materials. Nonlimiting examples of these materials include carbons, cationic zeolites, high silica zeolites, highly siliceous ordered mesoporous materials, sol gel materials, ALPO materials (microporous and mesoporous materials containing predominantly aluminum phosphorous and oxygen), SAPO materials (microporous and mesoporous materials containing predominantly silicon aluminum phosphorous and oxygen), MOF materials microporous and mesoporous materials comprised of a metal organic framework) and ZIF materials (microporous and mesoporous materials comprised of zeolitic imidazolate frameworks). Other materials include microporous and mesoporous sorbents functionalized with functional groups.

Examples of functional groups include primary, secondary, tertiary and other non protogenic basic groups such as amidines, guanidines and biguanides.

In one or more embodiments, the swing adsorption process using the polygon thermal contactors of the present techniques is a temperature swing adsorption (TSA) or a rapid cycle temperature swing adsorption (RCTSA). For TSA the total cycle times are typically less than 12 hours, preferably less than 8 hours, preferably less than 6 hours, preferably less than 4 hours. For RCTSA the total cycle times are typically less than 600 seconds, preferably less than 200 seconds, more preferably less than 100 seconds, and even more preferably less than 60 seconds.

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 volume percent (vol. %) $CO_2$, 4 parts per million (ppm) $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology may be useful for gas reserves that exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

In one or more embodiments, the streams provided to the adsorbent bed and removed from an adsorbent bed may have different compositions. For example, the hydrocarbon containing stream may have greater than 0.005 volume percent $CO_2$ based on the total volume of the gaseous feed stream and an adsorbent material in the adsorbent bed has a higher selectivity to $CO_2$ as compared to hydrocarbons. Also, the product stream may have greater than 98 volume percent hydrocarbons based on the total volume of the product stream. Further, the gaseous feed stream may be a hydrocarbon containing stream having greater than 20 volume percent $CO_2$ based on the total volume of the gaseous containing stream.

In view of the many possible embodiments to which the principles of the disclosed invention may be applied, it should be recognized that the illustrative embodiments are only preferred examples of the invention and should not be taken as limiting the scope of the invention.

What is claimed is:

1. An adsorbent bed unit for a cyclical swing process comprising:
    a housing having an interior region;
    one or more contactors disposed in the interior region, each of the one or more contactors having a first portion and a second portion, wherein the first portion is disposed upstream of the second portion, wherein the first portion comprises a first adsorbent material and the second portion comprises a second adsorbent material, and wherein each of the one or more contactors have fluid flow passages through the first adsorbent material and the second adsorbent material; and
    each of the one or more contactors have at least one gas purge inlet conduit disposed within the first portion and configured to provide a purge flow passage to a mid-purge distribution zone between the first portion and the second portion, wherein the purge flow passage within the at least one gas purge inlet conduit is fluidly separated and independent of the fluid flow passages through the first adsorbent material.

2. The adsorbent bed unit of claim 1, further comprising a plenum closure component disposed upstream of the first portion and having a distribution zone, wherein the plenum closure component is configured to:
    provide fluid communication between the distribution zone and the mid-purge distribution zone via the at least one gas purge inlet conduit;
    provide fluid communication between a primary fluid zone formed between the first portion and the plenum closure component and a location external to the housing; and
    isolate direct fluid communication between the distribution zone and the primary fluid zone.

3. The adsorbent bed unit of claim 2, wherein the plenum closure component comprises one or more outlet conduits disposed adjacent to the first portion in the primary fluid zone and configured to provide fluid communication between the primary fluid zone and the external location.

4. The adsorbent bed unit of claim 2, wherein one or more contactors comprise a first contactor and a second contactor, and,
    wherein the plenum closure component is configured to:
    provide fluid communication between the distribution zone and the respective mid-purge distribution zones of the via the respective gas purge inlet conduit;
    provide fluid communication between primary fluid zone between the respective first portions and the plenum closure component and the location external to the housing; and
    isolate direct fluid communication between the distribution zone and the primary fluid zone.

5. The adsorbent bed unit of claim 1, wherein the housing is configured to maintain a pressure from 0 bar a to 100 bar a within the interior region.

6. The adsorbent bed unit of claim 1, wherein the mid-purge distribution zone is positioned at a location that is between 10% and 60% of the length of the adsorbent bed.

7. The adsorbent bed unit of claim 1, wherein the mid-purge distribution zone is positioned at a location that is between 20% and 40% of the length of the adsorbent bed.

8. The adsorbent bed unit of claim 1, wherein the purge flow passage and the fluid flow passages are substantially parallel relative to the flow through the first portion.

9. A method of manufacturing a contactor, comprising:
    fabricating a first portion of a contactor, wherein the first portion is configured to provide first fluid flow passages through a first adsorbent material, wherein the first portion has a gas purge inlet conduit that is configured to provide a purge flow passage through the first portion and the purge flow passage is fluidly separated and independent of the fluid flow passages through the first portion;

fabricating a second portion of the contactor comprising a second adsorbent material, wherein the second portion is configured to provide second fluid flow passages through the second adsorbent material; and securing the first portion to the second portion, wherein the gas purge inlet conduit is configured to provide a purge flow passages to a mid-purge distribution zone between the first portion and the second portion, wherein the purge flow passage is fluidly separated and independent of the first fluid flow passages.

10. The method of claim 9, wherein fabricating the first portion of the contactor comprises:
providing a sheet of the first adsorbent material;
securing the sheet of the first adsorbent material to the gas purge inlet conduit; and
wrapping the sheet of the first adsorbent material around the gas inlet conduit.

11. The method of claim 10, wherein securing the sheet of the first adsorbent material to the gas purge inlet conduit comprises welding the sheet of the first adsorbent material to the gas purge inlet conduit.

12. The method of claim 10, wherein wrapping the sheet of the first adsorbent material around a gas inlet conduit comprises mechanically rolling the sheet of first adsorbent material around a gas inlet conduit to a designed size.

13. The method of claim 10, wherein the first adsorbent material comprises one or more of alumina, microporous zeolites, carbons, cationic zeolites, high silica zeolites, highly siliceous ordered mesoporous materials, sol gel materials, ALPO materials, SAPO materials, MOF materials and ZIF materials.

14. The method of claim 10, further comprising trimming the wrapped sheet of first adsorbent material into a polygon shape.

15. The method of claim 10, further comprising disposing a liner around the outer surface of the sheet of first adsorbent material.

16. The method of claim 15, further comprising disposing a sealing component between the liner and the sheet of first adsorbent material, wherein the sealing component is configured to prevent fluids from passing between the liner and the sheet of first adsorbent material.

17. A method of manufacturing an adsorbent bed unit, comprising:
fabricating a plurality of contactors, wherein each of the plurality of contactors comprises:
a first portion configured to provide first fluid flow passages through a first adsorbent material, wherein the first portion has a gas purge inlet conduit configured to provide a purge flow passage through the first portion and the purge flow passage is fluidly separated and independent of the first fluid flow passages through the first portion;
a second portion comprising a second adsorbent material, wherein the second portion is configured to provide second fluid flow passages through the second adsorbent material;
wherein the first portion is secured to the second portion; and
wherein the gas purge inlet conduit is configured to provide a purge flow passage to a mid-purge distribution zone between the first portion and the second portion, wherein the purge flow passage is fluidly separated and independent of the fluid flow passages;
securing two or more plurality of contactors to each other to form an assembly of contactors;
constructing an adsorbent bed unit housing, wherein the an adsorbent bed unit housing has an interior region; and
disposing the assembly of contactors into an adsorbent bed unit housing.

18. The method of claim 17, wherein each of the contactors in the assembly of contactors provides separate flow passages through the respective contactor.

19. The method of claim 17, wherein each of the contactors in the assembly of contactors comprises a liner disposed around the first portion of the contactor.

20. The method of claim 19, wherein each liner has one or more tabs that extends beyond the first portion and wherein securing the two or more plurality of contactors to each other comprises welding tabs between adjacent contactors.

21. The method of claim 17, further comprising securing a plenum closure component to the first portion, wherein the plenum closure component has a distribution zone, wherein the plenum closure component is configured to:
provide fluid communication between the distribution zone and the mid-purge distribution zone via the gas purge inlet for each of the contactors;
provide fluid communication between a primary fluid zone between the first portion and the plenum closure component and an external location external to the housing; and
isolate direct fluid communication between the distribution zone and the primary fluid zone.

22. The method of claim 21, wherein the plenum closure component comprises a plenum bottom plate, a plenum top plate and a plenum side plate; and
wherein securing a plenum closure component to the first portion comprises:
securing the plenum top plate and the plenum side plate to outlet gas conduits.

23. A cyclical swing adsorption process for removing contaminants from gas feed streams comprising the steps of:
a) passing a gaseous feed stream at a feed pressure through an adsorbent bed unit having an adsorbent contactor to separate one or more contaminants from the gaseous feed stream to form a product stream, wherein the adsorbent contactor has a first portion and a second portion;
b) interrupting the flow of the gaseous feed stream;
c) performing a depressurization step, wherein the depressurization step reduces the pressure within the adsorbent bed unit;
d) performing a purge step, wherein the purge step involves passing a purge stream to a mid-purge distribution zone between first portion and the second portion and wherein the purge step comprises passing the purge stream through a distribution zone in a plenum closure component disposed upstream of the first portion prior to passing the purge stream to the mid-purge distribution zone via a at least one gas purge inlet conduit;
e) performing a re-pressurization step, wherein the re-pressurization step increases the pressure within the adsorbent bed unit; and
f) repeating the steps a) to e) for at least one additional cycle.

24. The process of claim 23, wherein the mid-purge distribution zone is positioned at a location that is between 10% and 60% of the length of the adsorbent bed.

25. The process of claim 23, wherein the mid-purge distribution zone is positioned at a location that is between 20% and 40% of the length of the adsorbent bed.

26. A cyclical swing adsorption process for removing contaminants from gas feed streams comprising the steps of:
  a) passing a gaseous feed stream at a feed pressure through an adsorbent bed unit having an adsorbent contactor to separate one or more contaminants from the gaseous feed stream to form a product stream, wherein the adsorbent contactor has a first portion and a second portion;
  b) interrupting the flow of the gaseous feed stream;
  c) performing a depressurization step, wherein the depressurization step reduces the pressure within the adsorbent bed unit
  d) performing a purge step, wherein the purge step involves passing a purge stream to a mid-purge distribution zone between the first portion and the second portion and wherein the purge step comprises passing the product stream through a primary fluid zone in a plenum closure component disposed upstream of the first portion, wherein the product stream is isolated from direct fluid communication between the distribution zone and the primary fluid zone;
  e) performing a re-pressurization step, wherein the re-pressurization step increases the pressure within the adsorbent bed unit; and
  f) repeating the steps a) to e) for at least one additional cycle.

27. The process of claim 26, wherein the mid-purge distribution zone is positioned at a location that is between 10% and 60% of the length of the adsorbent bed.

28. The process of claim 26, wherein the mid-purge distribution zone is positioned at a location that is between 20% and 40% of the length of the adsorbent bed.

* * * * *